UNITED STATES PATENT OFFICE.

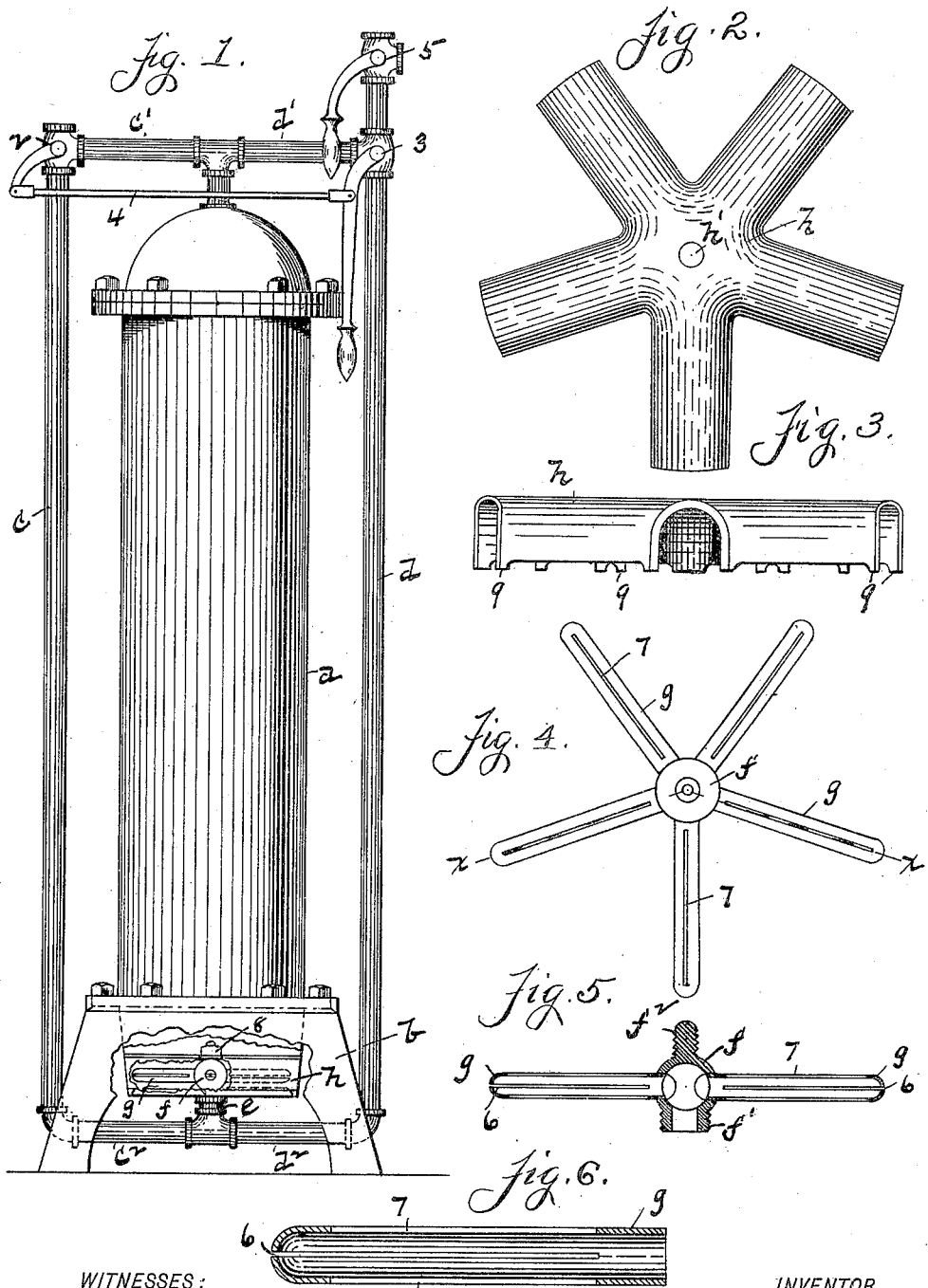

WILLIAM W. WILSON, OF HOLYOKE, MASSACHUSETTS.

FILTER.

SPECIFICATION forming part of Letters Patent No. 604,573, dated May 24, 1898.

Application filed February 8, 1896. Serial No. 578,524. (No model.)

*To all whom it may concern:*

Be it known that I, WILLIAM W. WILSON, a citizen of the United States, residing at Holyoke, in the county of Hampden and State of Massachusetts, have invented a new and useful Improvement in Filters, of which the following is a specification, reference being had to the accompanying drawings, forming part thereof.

My invention relates to filters for purifying water, oil, and other liquids, and has especial reference to filters for domestic purposes, or what are known as "house-filters."

The object of the invention is to provide improved means for discharging the filtered water from and for introducing the cleansing-water to such filters with a view to expediting both operations and avoiding the use of the usual screens of perforated metal.

To these ends my invention consists in the novel means for this purpose hereinafter fully described, and particularly pointed out in the claims.

Referring to the drawings, in which like letters and figures designate like parts in the several views, Figure 1 is a side elevation, partly broken away, of a filter provided with discharging means embodying the invention. Fig. 2 is a plan view of the guard preferably used in connection with the discharging device. Fig. 3 is a side view of said guard. Fig. 4 is a plan view of the discharging device. Fig. 5 is a sectional view thereof, taken at the line $x\,x$ of Fig. 4. Fig. 6 is a longitudinal section of one of the radial members of said device, drawn to a larger scale.

The letter $a$ designates the shell or body of a filter, which rests upon a suitable base or stand $b$, and has communicating therewith pipes as follows: A water-supply pipe $c$, communicating with the filter at its upper end by means of a branch pipe $c'$ and at its lower end by means of a branch pipe $c^2$, and a service-pipe $d$, communicating with the filter at the upper end thereof by means of a branch pipe $d'$ and at its lower end by means of a branch pipe $d^2$. At the junction of the pipes $c\,c'$ and $d\,d'$ are located the two-way valves 2 3, having their operating-levers connected together by a rod 4, whereby both valves are operated simultaneously by the movement of one lever, while a third two-way valve 5 is located in the service-pipe above the valve 3, which latter valve in one of its positions diverts the water from the service-pipe into a waste-pipe. During the filtering operation the water enters the filter at its upper end through pipes $c\,c'$ and issues therefrom at its lower end through pipes $d^2$ and $d$, while during the operation of washing the filter-bed by a reverse current the water enters the filter at its lower end through pipes $c\,c^2$ and leaves it at its upper end through pipes $d'$ and $d$ and passes to the waste-pipe. I have shown this form of filter merely as one example of filters generally to which my present invention can be applied, the invention relating solely to the means located at the bottom of the filter for affording passage to the water during both the filtering and washing operations.

Communication between the pipes $c^2$ and $d^2$ with the interior of the filter is established through the short pipe or coupling $e$, extending through the bottom of the filter in any manner to make a tight joint therewith, and at the upper end of said short section of pipe, which I will herein term the "collecting-tube," I locate the globular head $f$, which may be formed integrally with the tube or be attached to it in any suitable manner to form a continuation of the bore of the tube. As herein shown, (see Fig. 5,) said head $f$ is provided with an exteriorly-threaded flange $f'$, whereby it is adapted to be screwed into the bottom of the filter from the upper side of the latter, while the tube $e$ is similarly connected to said bottom from the under side thereof; but such construction is immaterial, it being essential merely that said head shall in some manner constitute the upper end of the tube and be in open communication therewith. The letter $g$ designates a series of hollow members extending radially from said head and having open communication therewith, said members preferably consisting, as shown, of round tubes suitably seated at their inner ends in holes formed in the head and occupying the same horizontal plane. Each of said members $g$ is divided longitudinally into two parts for the greater portion of its length by a narrow slit 6, extending from its outer nearly to its inner end, and being composed of thin sheet metal the elasticity of said two parts permits them to expand to widen said slit 6 when pressure is exerted against them internally and causes them to again contract and restore the slit to its normal width when such pressure is removed. Said slits 6 thus form a constantly open waterway leading to the interior of the head $f$ and the collecting-tube, the width of which is such as to prevent the escape of the particles of filtering material therethrough, and the combined length of which is such as to afford a very free service of filtered water during the operation of filtration, while they also form a waterway which, during the operation of washing the filter-bed by a reverse current, is greatly increased in its capacity by the yielding of the members $g$ to the pressure of such reverse current of water. I have herein shown said head $f$ as being provided with five of such radiating members $g$; but the number will be increased or diminished according to the requirements of the particular filter with which the device is used, and instead of being made straight, as shown, the members $g$ can be bent to any desired shape longitudinally without materially affecting their operation, as described. With a view to still further increasing the water-passing capacity of the device I prefer to provide each of the two parts of each member $g$ with a longitudinal slit 7, extending the greater portion of the length thereof, which slits also increase the elasticity of said parts. As before stated, the width of the slits 6 7 is such as to prevent the passage therethrough of the particles composing the filtering material, and to prevent as far as possible any tendency of said material to collect about the members $g$ and clog said slits, I prefer to use in connection therewith a guard $h$, which is shaped to correspond with the head $f$ and its radiating members, as shown in Fig. 2, whereby it is adapted to rest upon the bottom of the filter and cover said head and its members, as represented in Fig. 1, in which said guard is shown as being broken away upon one side of the head to show the member $g$ within it. The guard is provided with a central hole $h'$ to receive a threaded nipple $f^2$ at the top of the head $f$, and a nut 8, screwed upon said nipple above the guard, holds the latter securely in place. Said guard is imperforate and is provided at the bottom with short feet 9, which rest upon the bottom of the filter and leave a shallow open waterway between the body thereof and said bottom, which effectually prevents any accumulation of the filtering material about the members $g$, while not impeding the passage of water in either direction. While I have herein shown the filter as being provided with but one collecting-tube, it will be understood that the number used will depend upon the size and object of the filter and that each will be provided with its head $f$ and members $g$ in the same manner.

By the use of the device herein described the necessity of using screens of wire-gauze or perforated metal with their manifold objections is entirely avoided and a maximum service of filtered water is secured, as well as a supply of cleansing-water when the current is reversed, which enables the filter-bed to be cleaned quickly and thoroughly.

Instead of extending the slit 6 across the end of the tube $g$, as shown, it may terminate near the outer end of the latter upon each side, thus leaving the end wall of the tube unbroken, such change merely affecting the elasticity of the tube and not its mode of operation.

Having thus fully described my invention, what I claim, and desire to secure by Letters Patent, is—

1. In a filter, a collecting-tube for conducting filtered water from and washing-water to the filtering-chamber, said tube having connected thereto within said chamber, a hollow head provided with a plurality of laterally-projecting, tubular arms, each of which arms is provided with a plurality of longitudinal slits adapted to permit the passage of water therethrough while preventing the passage of the particles composing the filtering material, substantially as described.

2. In a filter, the combination with the filtering-chamber thereof of a tube for conducting filtered water from and washing-water to said chamber, said tube having connected to its end within the chamber a hollow head provided with a plurality of radially-disposed tubes, each of which tubes is longitudinally slitted to permit water to pass therethrough while preventing the passage of sand or similar filtering material, substantially as described.

3. In a filter, the combination with a discharging device located within the filtering-chamber and forming the outlet therefrom for filtered water consisting of a globular head provided with a plurality of radially-disposed and longitudinally-slitted members, of an imperforate guard adapted to rest upon the bottom of said chamber and to cover said head and its members, said guard having an open waterway between its bottom and the bottom of said chamber, substantially as set forth.

4. The discharging device for filters composed of the globular head $f$ having projecting radially therefrom the tubular members $g$ provided with the dividing-slits 6, substantially as described.

WILLIAM W. WILSON.

Witnesses:
WM. H. CHAPMAN,
J. E. CHAPMAN.